United States Patent
Cho et al.

(10) Patent No.: US 9,813,913 B2
(45) Date of Patent: Nov. 7, 2017

(54) METHOD AND APPARATUS FOR DETECTING UNAUTHORIZED ACCESS POINT

(71) Applicant: SAMSUNG SDS CO., LTD., Seoul (KR)

(72) Inventors: Seong-Myun Cho, Seoul (KR); Kyu-Hwan Yun, Seongnam-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/519,582

(22) Filed: Oct. 21, 2014

(65) Prior Publication Data

US 2015/0121527 A1   Apr. 30, 2015

(30) Foreign Application Priority Data

Oct. 29, 2013   (KR) .................. 10-2013-0129313

(51) Int. Cl.
| | |
|---|---|
| *H04L 9/00* | (2006.01) |
| *H04W 12/12* | (2009.01) |
| *H04L 29/06* | (2006.01) |
| *H04W 88/08* | (2009.01) |

(52) U.S. Cl.
CPC .......... *H04W 12/12* (2013.01); *H04L 63/164* (2013.01); *H04W 88/08* (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 2004/0068668 A1* | 4/2004 | Lor | .................. | H04L 63/107 726/15 |
| 2006/0193258 A1* | 8/2006 | Ballai | .................. | H04L 63/10 370/230 |
| 2007/0264965 A1* | 11/2007 | Taniguchi | ............ | H04W 12/02 455/403 |
| 2011/0087882 A1* | 4/2011 | Kuo | .................. | G06F 21/57 713/156 |
| 2011/0314147 A1* | 12/2011 | Whelan | ............ | H04L 63/1408 709/224 |
| 2012/0167175 A1* | 6/2012 | Choi | .................. | H04L 63/101 726/3 |
| 2014/0073289 A1* | 3/2014 | Velasco | ............ | H04W 12/04 455/411 |
| 2014/0113674 A1* | 4/2014 | Joseph | ............ | H04W 4/021 455/519 |

* cited by examiner

*Primary Examiner* — Josnel Jeudy
(74) *Attorney, Agent, or Firm* — Sughrue Mion, PLLC

(57) ABSTRACT

There is provided a method and apparatus for detecting an unauthorized access point. The method for detecting an unauthorized access point according to an embodiment of the present disclosure includes making an attempt to deliver, through an access point to a validation server, a message that includes network information regarding a network access of a terminal device and requests a validity verification of the network information; and determining that the access point is unauthorized when a response indicating that the network information is valid is not received from the validation server. According to the embodiment of the present disclosure, it is possible to implement a device for determining an unauthorized access point device in a general manner, independent of a specific device.

11 Claims, 3 Drawing Sheets

[FIG. 1]
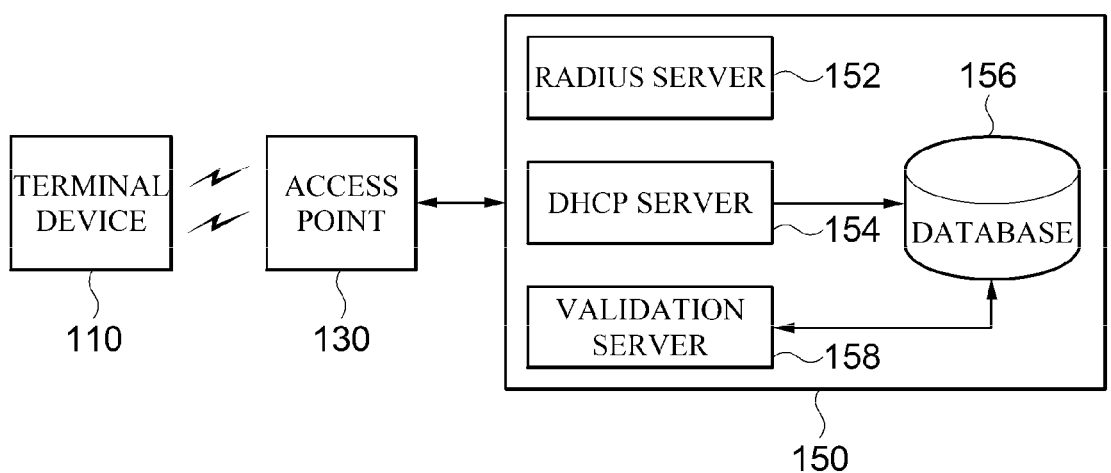
[FIG. 2]
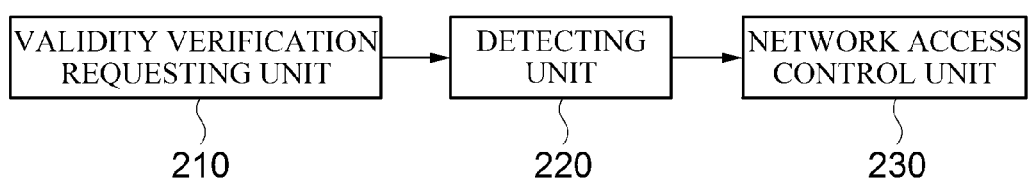

[FIG. 3]
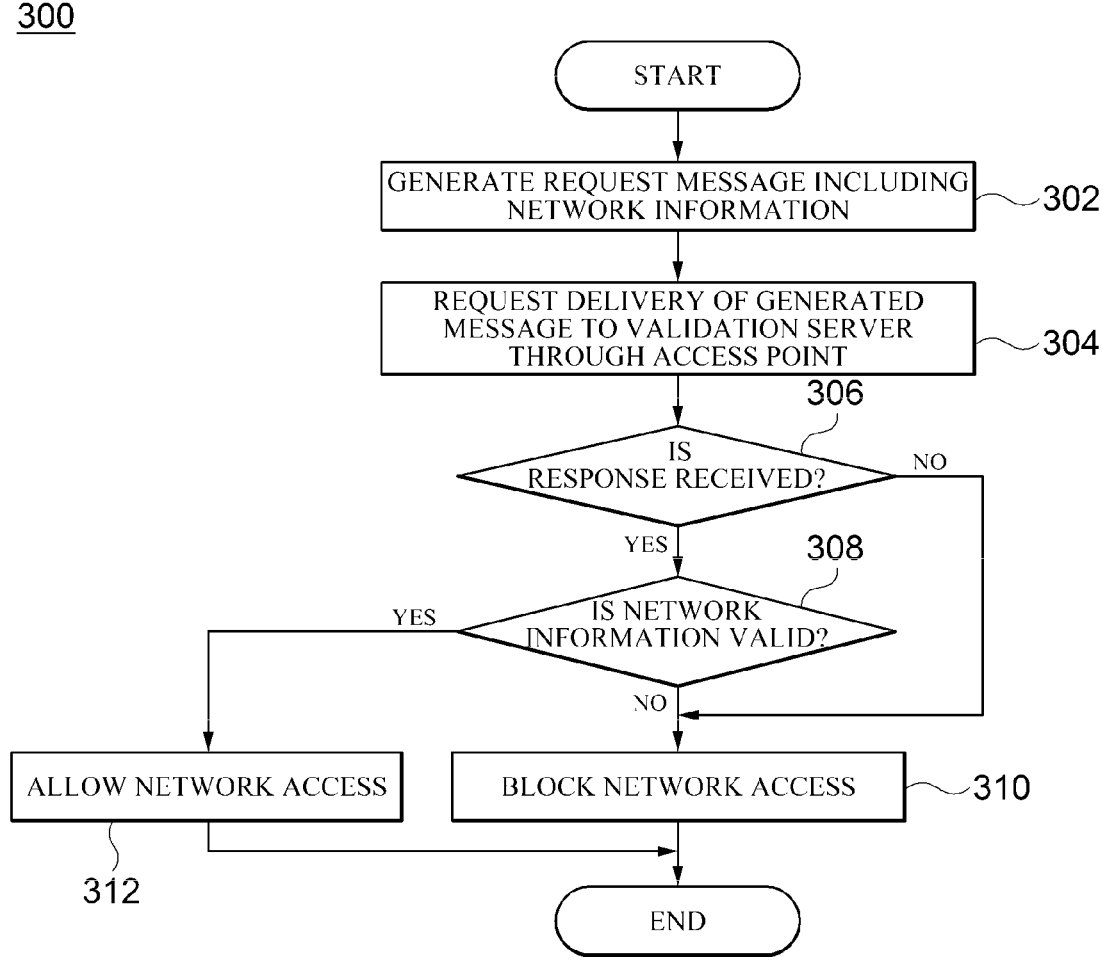

[FIG. 4]
158
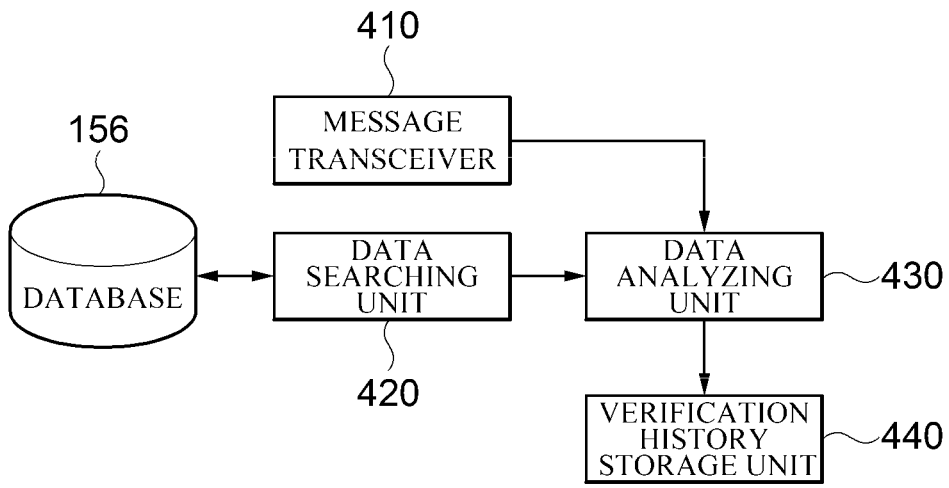
[FIG. 5]
500
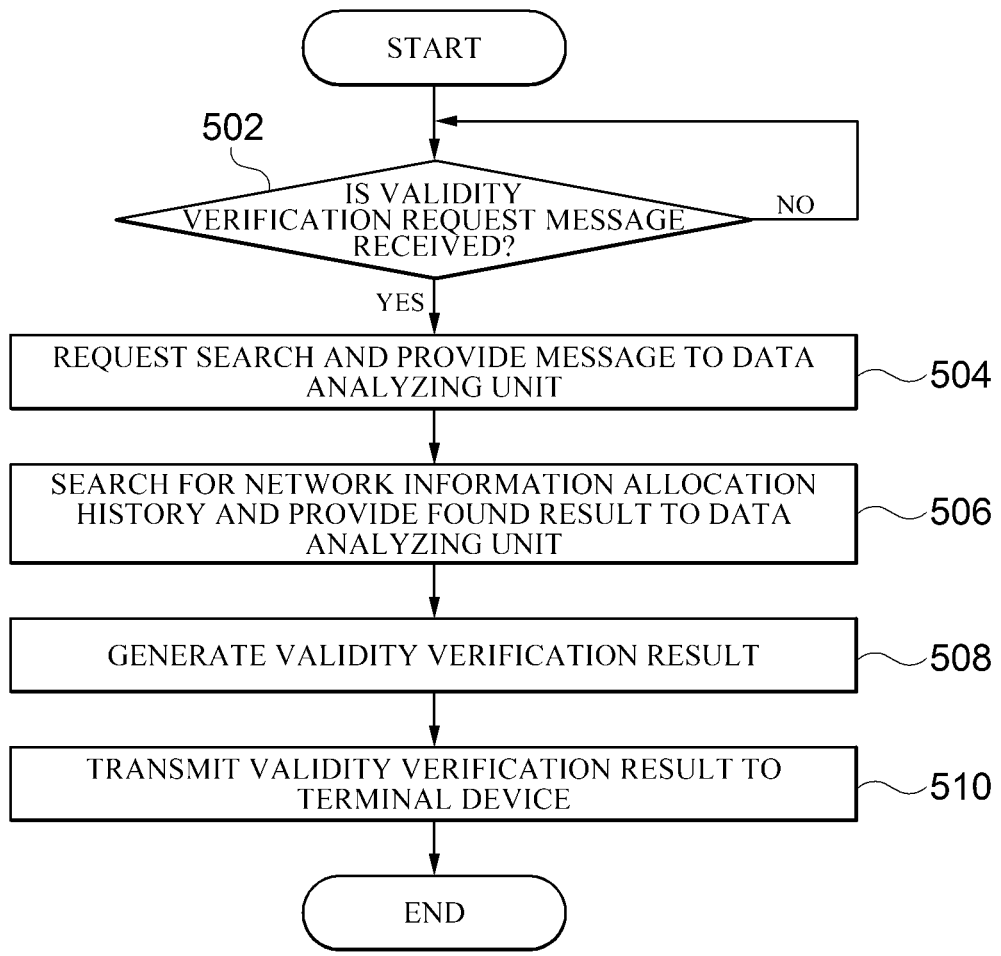

METHOD AND APPARATUS FOR DETECTING UNAUTHORIZED ACCESS POINT

CROSS-REFERENCE TO RELATED APPLICATION

This application claims priority to and the benefit of Korean Patent Application No. 10-2013-0129313, filed on Oct. 29, 2013, the disclosure of which is incorporated herein by reference in its entirety.

BACKGROUND

1. Field

Embodiments of the present disclosure relate to network security, and more specifically, to a method and apparatus for blocking an access through an unauthorized access point (AP).

2. Discussion of Related Art

In recent years, the demand for terminal devices such as mobile devices has been growing rapidly. Such terminal devices may communicate radio signals with access points (APs) that are wireless devices for providing access to a wireless network through defined frequency channels. Examples of the wireless network may include a wireless LAN.

A wireless network environment supports data exchange through an access to a wireless network while a user of a terminal device moves. However, since the terminal device is physically separated from the network equipment and the exchanged data may also be sniffed in the air, there are security concerns such as illegal network access or theft of information using an unauthorized access point (e.g., a rogue AP).

As an example, in order to solve the problem, several wireless network-related equipment supply companies provide a function of managing a wireless network control device and a plurality of access points connected to the wireless network control device to check a normal access point and an unauthorized access point. However, such a function is difficult to use in network devices of a variety of companies.

As another example, there is an unauthorized access point determination method of using a wireless intrusion determination system to check traffic that is generated from an access point. However, since the wireless intrusion determination system may be useless for a radio shadow area, it is difficult to completely protect against an unauthorized access point. In addition, when the traffic amount is large, it is difficult to check and block the traffic in real time.

SUMMARY

Example embodiments of the present disclosure provide a terminal device capable of determining an unauthorized access point.

Example embodiments of the present disclosure also provide a terminal device capable of determining whether an access point is unauthorized according to a response to a request for a validity verification of network information allocated to a terminal device, and a method of using the same to detect an unauthorized access point.

Example embodiments of the present disclosure also provide a validation server that performs a validity verification based on an allocation history of network information allocated by a (dynamic) host configuration protocol server when a request for the validity verification of the network information is received, and then transmits a result thereof to a terminal device.

According to an example embodiment of the present disclosure, there is provided a method for detecting an unauthorized access point, the method including: making an attempt to deliver, through an access point to a validation server, a message that includes network information regarding a network access of a terminal device and requests a validity verification of the network information; and determining that the access point is unauthorized when a response indicating that the network information is valid is not received from the validation server.

The determining may include determining that the access point is unauthorized when the validation server is inaccessible to the terminal device for a predetermined time.

The determining may include determining that the access point is unauthorized when a response indicating that the network information is invalid is received from the validation server.

The method may further include blocking the network access of the terminal device when it is determined that the access point is unauthorized.

The network information may include IP address information allocated to the terminal device.

According to another example embodiment of the present disclosure, there is provided a computer readable storage medium having computer executable instructions which, when executed, perform a method for detecting an unauthorized access point, the method including: making an attempt to deliver, through an access point to a validation server, a message that includes network information regarding a network access of a terminal device and requests a validity verification of the network information; and determining that the access point is unauthorized when a response indicating that the network information is valid is not received from the validation server.

According to still another example embodiment of the present disclosure, there is provided a device for detecting an unauthorized access point, the device including: a validity verification requesting unit configured to make an attempt to deliver, through an access point to a validation server, a message that includes network information regarding a network access of a terminal device and requests a validity verification of the network information; and a determining unit configured to determine that the access point is unauthorized when a response indicating that the network information is valid is not received from the validation server.

The device may further include a network access control unit configured to block the network access when it is determined that the access point is unauthorized.

The determining unit may determine that the access point is unauthorized when the validation server is inaccessible to the terminal device for a predetermined time.

The determining unit may determine that the access point is unauthorized when a response indicating that the network information is invalid is received from the validation server.

The network information may include IP address information allocated to the terminal device.

According to yet another example embodiment of the present disclosure, there is provided a validation server, including: a message transceiver configured to receive a message that includes network information regarding a network access of a terminal device and requests a validity verification of the network information, and to transmit a response to the message; a data searching unit configured to search for a network information allocation history of the network information in the message in response to the reception; and a data analyzing unit configured to verify validity of the network information based on a result of the search, and to provide a result of the verification to the message transceiver as the response to the message.

The validation server may further include a verification history storage unit configured to store the result of the verification.

According to yet another example embodiment of the present disclosure, there is provided a method of detecting an unauthorized access point using a validation server, the method including: receiving a message that includes network information regarding a network access of a terminal device and requests a validity verification of the network information; searching for a network information allocation history of the network information in the message in response to the reception; verifying validity of the network information based on a result of the search; and providing a result of the verification to the terminal device as a response to the message.

The method may further include storing the result of the verification.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 1 is a diagram illustrating a network configuration for describing a determination of an unauthorized access point and a network control method according to an example embodiment;

FIG. 2 is a block diagram illustrating a device for detecting an unauthorized access point according to an example embodiment;

FIG. 3 is a flowchart illustrating a method for detecting an unauthorized access point according to an example embodiment;

FIG. 4 is a block configuration diagram illustrating an internal configuration of a validation server according to an example embodiment; and FIG. 5 is a flowchart illustrating a method of verifying validity of network information of a validation server according to an example embodiment.

DETAILED DESCRIPTION OF EXEMPLARY EMBODIMENTS

Hereinafter, example embodiments consistent with the present disclosure will be described with reference to the drawings. The following detailed description is provided to help comprehensive understanding of methods, devices and/or systems described in this specification. However, these are only examples, and the present disclosure is not limited thereto.

In the description below, when it is determined that detailed descriptions of related well-known functions unnecessarily obscure the gist of the present disclosure, detailed descriptions thereof will be omitted. Some terms described below are defined by considering functions in the present disclosure and meanings may vary depending on, for example, a user or operator's intentions or customs. Therefore, the meanings of terms should be interpreted based on the scope throughout this specification. The terminology used in detailed description is provided only to describe the example embodiments and not for purposes of limitation. Unless the context clearly indicates otherwise, the singular forms include the plural forms. It will be understood that the terms "comprises" or "includes" when used herein, specify some features, numbers, steps, operations, elements, and/or combinations thereof, but do not preclude the presence or possibility of one or more other features, numbers, steps, operations, elements, and/or combinations thereof in addition to the description. Likewise, the description of an example embodiment in terms of a combination of elements does not preclude the implementation of a suitable subcombination of elements.

FIG. 1 is a diagram illustrating a network configuration for describing a determination of an unauthorized access point and a network control method according to an example embodiment. The network configuration includes a terminal device 110, an access point 130, and a network management system 150. Here, the network management system 150 may include a remote authentication dial-in user service (RADIUS) server 152, a dynamic host configuration protocol (DHCP) server 154, a database 156, a validation server 158, and the like.

The terminal device 110 may include any type of device capable of performing packet communication via a network, and may include, for example, a notebook, a smart phone, a tablet PC, and an OA device for which a wireless LAN is provided.

Particularly, in the example embodiment, the terminal device 110 may include a device 200 (shown in FIG. 2) for detecting an unauthorized access point, and the device 200 may determine whether the access point 130 connected to the terminal device 110 is unauthorized, when network information regarding a network access, for example, information on an IP address, a gateway address, a domain name server (DNS) address, IP address allocation, an expiration time, and the like, is allocated. As will be described below, in response to the network information being set for or allocated to the terminal device 110 or updated with of new network information, the device 200 for detecting an unauthorized access point may determine whether the access point 130 is unauthorized. In addition, the device 200 for detecting an unauthorized access point may further include a function for blocking the network access when it is determined that the access point 130 is unauthorized.

The access point 130 is a relay device configured to connect the terminal devices 110 using wireless communications according to, for example, a wireless LAN standard, to servers in the network management system 150. For example, when the access point 130 is authorized, the access point 130 may relay data between the terminal device 110 and a server in the network management system 150 through a switch (not illustrated).

Meanwhile, when the access point 130 is an unauthorized access point (Rogue AP), the access point 130 cannot access the network management system 150 in a normal manner. Even if network information is allocated to the terminal device 110 that has accessed through the unauthorized access point 130, the network information is not allocated by the DHCP server 154 in the network management system 150.

The network management system 150 may support, for example, authentication, network information allocation and management, external network access, and the like, for the terminal device 110. In particular, in the example embodiment, the network management system 150 may verify validity of network information allocated to the terminal device 110 according to a request from the terminal device 110, and then provide a result thereof to the terminal device 110.

The RADIUS server 152 of the network management system 150 may perform, for example, authentication, authorization, account management, and the like, for the terminal device 110. Specifically, the terminal device 110 makes an attempt to connect to the access point 130 using a predetermined network service set identifier (SSID), and the terminal device 110, upon completion of the connection process with the access point 130, delivers user authentication information to the RADIUS server 152. Accordingly, the RADIUS server 152 may perform authentication of the user authentication information, and then transmit a result of the authentication to the terminal device 110 through the access point 130.

The DHCP server 154 may manage and allocate network information over the network. A history (hereinafter referred to as a "network information allocation history") of what network information is allocated by the DHCP server 154 may be maintained in the database 156. Specifically, when a network information allocation is requested from the terminal device 110 for which the RADIUS server 152 has completed the authentication process, the DHCP server 154 checks the network information allocation history in the database 156, allocates network information regarding the MAC address of the terminal device 110, and then transmits the information to the terminal device 110.

When a validity verification request of the network information is received from the terminal device 110, the validation server 158 checks validity of the network information in conjunction with the database 156, and then may provide a result thereof to the terminal device 110. Specifically, when the validation server 158 receives a validity verification request message including the network information from the terminal device 110, the validation server 158 may check whether the network information in the validity verification request message is present in the database 156, and generate a validity verification result. Here, the validity verification request message may be received through the access point 130 connected to the terminal device 110.

Meanwhile, the database 156 may be located outside the validation server 158 or in the validation server 158.

The following discussion illustrates a device which is included in the terminal device 110 and operates, in conjunction with the network management system 150, to detect an unauthorized access point, and a method for such detection.

FIG. 2 is a block diagram illustrating a device for detecting an unauthorized access point according to an example embodiment.

As illustrated, the device 200 for detecting an unauthorized access point may include a validity verification requesting unit 210, a detecting unit 220, and a network access control unit 230.

When network information is allocated to the terminal device 110, the validity verification requesting unit 210 generates a message that includes the network information and requests a validity verification of the network information, and may attempt to deliver the message to the validation server 158 through the access point 130.

In addition, when a response to the validity verification request message is not received for a predetermined time, the validity verification requesting unit 210 may attempt a predetermined number of times to deliver the validity verification request message to the validation server 158.

The validity verification requesting unit 210 may provide to the detecting unit 220 a notification as to whether the validation server 158 responds to the validity verification request message or provide to the detecting unit 220 a validity verification result received as a response to the validity verification request message.

The detecting unit 220 may determine whether the access point 130 is unauthorized based on the notification received from the validity verification requesting unit 210, and, when it is determined that the access point 130 is unauthorized, may provide a control signal for blocking a network access to the network access control unit 230.

In addition, the detecting unit 220 may determine whether the access point is unauthorized based on the validity verification result. Specifically, when the validity verification result indicating that the network information is valid is received, the detecting unit 220 may provide to the network access control unit 230 a control signal for allowing a network access using the network information. When the validity verification result indicating that the network information is invalid is received, the detecting unit 220 may determine that the access point 130 is unauthorized, and provide to the network access control unit 230 a control signal for blocking a network access.

According to a result of the determination by the detecting unit 220, that is, the control signal received from the detecting unit 220, the network access control unit 230 may block or allow a network access.

FIG. 3 is a flowchart illustrating a method for detecting an unauthorized access point 300 according to an example embodiment. The method illustrated in FIG. 3 may be performed by, for example, the above-described device 200 for detecting an unauthorized access point. While the flowchart illustrates that the method is performed in a plurality of operations, at least some operations may be performed in a different order, performed in combination with each other, omitted, or performed in sub-operations, or performed with at least one operation that is not illustrated being added thereto. In addition, according to embodiments, at least one operation that is not illustrated in FIG. 3 may also be performed along with the method illustrated in FIG. 3.

First, the validity verification requesting unit 210 of the device 200 for detecting an unauthorized access point generates a validity verification request message including network information (operation 302), transmits the message to the access point 130 to request that the access point 130 deliver the message to the validation server 158 (operation 304).

Then, the device 200 for detecting an unauthorized access point determines whether the access point 130 is an unauthorized access point. For example, in the method 300 of FIG. 3 described hereinbelow, this determination includes determination of whether the validation server 158 is inaccessible for a predetermined time and determination of whether the network information is valid.

First, the validity verification requesting unit 210 determines whether a response is received from the validation server 158 within a predetermined time (operation 306).

When it is determined in operation 306 that the response is not received, the validity verification requesting unit 210 provides information of "no response" to the detecting unit 220, and the detecting unit 220 determines that the terminal device 110 cannot access to the validation server 158 and the access point 130 is an unauthorized access point. Then, the detecting unit 220 provides a control signal for blocking the network access of the terminal device 110, to the network access control unit 230. Accordingly, the network access control unit 230 blocks the network access of the terminal device 110 through the access point 130 (operation 310).

Meanwhile, when it is determined in operation 306 that the response is received, the validity verification requesting unit 210 provides to the detecting unit 220 response information received from the validation server 158, and the detecting unit 220 determines whether the response information indicates the validity of the network information (operation 308).

When it is determined in operation 308 that the network information is valid, the detecting unit 220 provides a control signal for allowing the network access of the terminal device 110, to the network access control unit 230. Accordingly, the network access control unit 230 allows the network access of the terminal device 110 through the access point (operation 312).

Meanwhile, when it is determined in operation 308 that the network information is invalid, the detecting unit 220 determines that the access point 130 is unauthorized, and provides a control signal for blocking the network access, to the network access control unit 230. Accordingly, the network access control unit 230 blocks the network access of the terminal device 110 (operation 310).

Hereinafter, detailed configurations and operations of the validation server 158 for determining an unauthorized access point according to example embodiments will be described.

FIG. 4 is a block configuration diagram illustrating an internal configuration of the validation server 158 according to an example embodiment.

As illustrated, the validation server 158 may include a message transceiver 410, a data searching unit 420, a data analyzing unit 430, a verification history storage unit 440, and the like.

The message transceiver 410 may receive through the access point 130 the validity verification request message generated from the terminal device 110, and in response thereto, transmit a result of the verification to the terminal device 110 through the access point 130. The message transceiver 410 may provide the validity verification request message to the data analyzing unit 430 and request that the data searching unit 420 search for the network information.

The data searching unit 420 may search the network information allocation history of the database 156 according to the search request of the message transceiver 410 and then provide a result of the search to the data analyzing unit 430.

The data analyzing unit 430 may generate a validity verification result by comparing and analyzing the search result and the network information in the validity verification request message, and then provide the validity verification result to the message transceiver 410. The validity verification result is then provided to the terminal device 110 through the message transceiver 410. For example, the validity verification result may differ according to whether there is the network information in the network information allocation history. That is, when the network information is present in the network information allocation history, the validity verification result indicates that the network information is valid, and otherwise, the validity verification result indicates that the network information is invalid.

Meanwhile, the data analyzing unit 430 may store data including the validity verification result, the network information and/or information regarding the terminal device 110, and the like, in the verification history storage unit 440. The stored verification history may be checked later by an administrator of the validation server 158.

Operating processes of the validation server 158 having the above configuration will be described with reference to FIG. 5.

FIG. 5 is a flowchart illustrating a method 500 for describing a process for determining the unauthorized access point 130 through the validation server's 158 validity verification of network information according to an example embodiment. The method illustrated in FIG. 5 may be performed by, for example, the above-described validation server 158. While the flowchart illustrates that the method is performed in a plurality of operations, at least some operations may be performed in a different order, performed in combination with each other, omitted, or performed in sub-operations, or performed with at least one operation that is not illustrated being added thereto. In addition, according to embodiments, at least one operation that is not illustrated in FIG. 5 may also be performed along with the method illustrated in FIG. 5.

As illustrated, first, the message transceiver 410 determines whether the validity verification request message is received (operation 502).

When it is determined in operation 502 that the validity verification request message is received, the message transceiver 410 requests that the data searching unit 420 search for the network information, and provides the received validity verification request message to the data analyzing unit 430 (operation 504).

The data searching unit 420 searches for the network information allocation history stored in the database 156 according to the search request, and then provides a result of the search to the data analyzing unit 430 (operation 506).

The data analyzing unit 430 generates a validity verification result indicating whether the access point 130 to which the terminal device 110 has accessed is unauthorized by comparing and analyzing a result of the search and the network information in the validity verification request message, stores the validity verification result in the verification history storage unit 440 (operation 508), and provides the validity verification result to the message transceiver 410. Accordingly, the message transceiver 410 transmits the validity verification result to the terminal device 110 through the access point 130 (operation 510).

Then, the terminal device 110 may determine whether the access point 130 is unauthorized through the device 200 for detecting an unauthorized access point and then control the network access. Specifically, when the validity verification result indicates that the network information is invalid, the network access is blocked, and otherwise, the network access may be allowed.

In the above-described example embodiments, it is illustrated that a validity verification result indicating the validity of network information and a validity verification result indicating the invalidity of network information may be transmitted to the terminal device 110. However, when network information is invalid, a response to the validity verification request message may not be transmitted, although the result indicating the validity of network information may be transmitted to the terminal device 110.

According to example embodiments, a terminal device makes an attempt to deliver, to a validation server, a request for a validity verification of network information to determine whether the access point is unauthorized. Therefore, there is no need to manage a list of authorized access points or perform traffic analysis in order to detect an unauthorized access point.

In addition, according to example embodiments, it is determined whether the access point is unauthorized by verifying validity of network information such as an IP address allocated by a dynamic host configuration protocol (DHCP) server. Therefore, there is no need to build a separate database of authorized access points for determining an unauthorized access point.

According to example embodiments, an unauthorized access point is determined at a terminal device. Therefore, it is possible to implement a device for detecting an unauthorized access point in a manner that is independent of a specific device.

Meanwhile, the example embodiment may include a computer readable recording medium including a program for executing methods described in this specification with a computer, the methods including the method 300 of detecting an unauthorized wireless access and the method 500 of determining the unauthorized access point 130 through validity verification of network information of the validation server 158. The computer readable recording medium may include a program instruction, a local data file, and a local data structure, and/or combinations and subcombinations thereof. The medium may be specially designed and prepared for the present disclosure or a generally available medium in the field of computer software may be used. Examples of the computer readable recording medium include magnetic media such as a hard disk, a floppy disk, and a magnetic tape, optical media such as a CD-ROM and a DVD, magneto-optical media such as a floptical disk, and a hard device such as a ROM, a RAM, and a flash memory, that is specially made to store and perform the program instruction. Examples of the program instruction may include a machine code generated by a compiler and a high-level language code that can be executed in a computer using an interpreter.

While the present disclosure has been described above in detail with reference to representative embodiments, it is understood by those skilled in the art that the embodiment may be variously modified without departing from the scope of the present disclosure. Therefore, the scope of the present disclosure is defined not by the described embodiment but by the appended claims, and encompasses equivalents that fall within the scope of the appended claims.

What is claimed is:

1. A method for detecting an unauthorized access point, comprising:
   receiving, from an access point, network information allocated to a terminal device by the access point regarding a wireless network access by the terminal device via the access point;
   making, by the terminal device, a wireless transmission to the access point, the wireless transmission including a message directed to a validation server, the message comprising the network information and requesting a validity verification of the network information;
   determining, by the terminal device, that the access point is unauthorized when at least one from among a response indicating that the network information is invalid is received from the validation server, or the validation server is inaccessible to the terminal device for a predetermined time following the wireless transmission,
   wherein, in response to determining that the access point is unauthorized, the terminal device discontinues wireless communication between the terminal device and the access point, and
   wherein, in response to a receiving a response indicating that the network information is authorized from the validation server, the terminal device continues the wireless communication between the terminal device and the access point.

2. The method according to claim 1, further comprising:
   blocking the wireless network access of the terminal device when it is determined that the access point is unauthorized.

3. The method according to claim 1, wherein the network information comprises IP address information allocated to the terminal device.

4. A non-transitory computer readable storage medium having computer executable instructions stored thereon which, when executed, perform a method for detecting an unauthorized access point, comprising:
   receiving, from an access point, network information allocated to a terminal device by the access point regarding a wireless network access by the terminal device via the access point;
   making, by the terminal device, a wireless transmission to the access point, the wireless transmission including a message directed to a validation server, the message comprising the network information and requesting a validity verification of the network information;
   determining, by the terminal device, that the access point is unauthorized when at least one from among a response indicating that the network information is invalid is received from the validation server, or the validation server is inaccessible to the terminal device for a predetermined time following the wireless transmission,
   wherein, in response to determining that the access point is unauthorized, the terminal device discontinues wireless communication between the terminal device and the access point, and
   wherein, in response to a receiving a response indicating that the network information is valid from the validation server, the terminal device continues the wireless communication between the terminal device and the access point.

5. A device for detecting an unauthorized access point, comprising:
   at least one hardware processor configured to:
      receive, from an access point, network information allocated to a terminal device by the access point regarding a wireless network access by the terminal device via the access point
      make a wireless transmission to the access point, the wireless transmission including a message directed to a validation server, the message comprising the network information and requesting a validity verification of the network information; and
      determine that the access point is unauthorized when at least one from among a response indicating that the network information is invalid is received from the validation server, or the validation server is inaccessible to the terminal device for a predetermined time,
   wherein, in response to determining that the access point is unauthorized, the terminal device discontinues wireless communication between the terminal device and the access point, and
   wherein, in response to a receiving a response indicating that the network information is valid from the validation server, the terminal device continues the wireless communication between the terminal device and the access point.

6. The device according to claim 5,
wherein the at least one hardware processor is further configured to block the wireless network access when it is determined that the access point is unauthorized.

7. The device according to claim 5, wherein the network information comprises IP address information allocated to the terminal device.

8. A validation server, comprising:
a message transceiver configured to receive a message from a terminal device, the message contained in a wireless transmission from the terminal device to an access point, the message comprising network information allocated to the terminal device by the access point regarding a wireless network access by the terminal device via the access point and requesting a validity verification of the network information, and to transmit a response to the message to the terminal device; and
at least one hardware processor configured to:
search for a network information allocation history of the network information in the message in response to the reception; and
verify validity of the network information based on a result of the search, and to provide a result of the verification to the message transceiver as the response to the message.

9. The validation server according to claim 8, further comprising:
a verification history storage unit configured to store the result of the verification.

10. A method for detecting an unauthorized access point using a validation server, comprising:
receiving, from a terminal device, a message contained in a wireless transmission from the terminal device to an access point, the message comprising network information allocated to the terminal device by the access point regarding a wireless network access by the terminal device via the access point and requesting a validity verification of the network information;
searching for a network information allocation history of the network information in the message in response to the reception;
verifying validity of the network information based on a result of the search; and
providing a result of the verification to the terminal device as a response to the message.

11. The method according to claim 10, further comprising:
storing the result of the verification.

\* \* \* \* \*